United States Patent
Ebrahimi Afrouzi (12)

(10) Patent No.: US 10,765,984 B1
(45) Date of Patent: Sep. 8, 2020

(54) VIBRATING AIR FILTER FOR ROBOTIC VACUUMS

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 258 days.

(21) Appl. No.: 16/015,467

(22) Filed: Jun. 22, 2018

Related U.S. Application Data

(60) Provisional application No. 62/524,294, filed on Jun. 23, 2017.

(51) Int. Cl.
   *B01D 46/00* (2006.01)
   *A47L 9/10* (2006.01)
   *A47L 9/28* (2006.01)

(52) U.S. Cl.
   CPC .......... *B01D 46/0075* (2013.01); *A47L 9/106* (2013.01); *A47L 9/2836* (2013.01); *A47L 2201/00* (2013.01); *B01D 2279/55* (2013.01)

(58) Field of Classification Search
   CPC . B01D 46/0075; B01D 2279/55; A47L 9/106; A47L 9/2836; A47L 2201/00
   See application file for complete search history.

(56) References Cited

U.S. PATENT DOCUMENTS

| | | | |
|---|---|---|---|
| 3,808,776 A * | 5/1974 | Jesernig | B01D 46/0075 55/300 |
| 4,482,367 A | 11/1984 | Howeth | |
| 4,557,738 A * | 12/1985 | Menasian | A47L 9/20 55/288 |
| 4,787,923 A | 11/1988 | Fleigle et al. | |
| 7,178,410 B2 | 2/2007 | Fraden et al. | |
| 7,201,786 B2 | 4/2007 | Wegelin et al. | |
| 8,083,841 B2 | 12/2011 | Cheng | |

* cited by examiner

*Primary Examiner* — Robert Clemente

(57) ABSTRACT

A vibrating air filter of a robotic vacuum comprising an electromagnet, a permanent magnet and an air filter. The electromagnet may comprise a metal wire and a power source connected to a first end of the wire. The power source may deliver electric pulses in alternating directions through the wire creating an electromagnet. The metal wire may be coiled around or placed adjacent to the permanent magnet and a second end of the wire may be connected to an air filter. Interaction between the magnetic fields of the electromagnet and permanent magnet may cause vibration of the wire and hence connected filter. Vibration of the filter may loosen any dust and debris latched onto the filter that may be shed into a dust bin of the vacuum.

20 Claims, 3 Drawing Sheets

VIBRATING AIR FILTER FOR ROBOTIC VACUUMS

CROSS-REFERENCE TO RELATED APPLICATIONS

Figure 1:
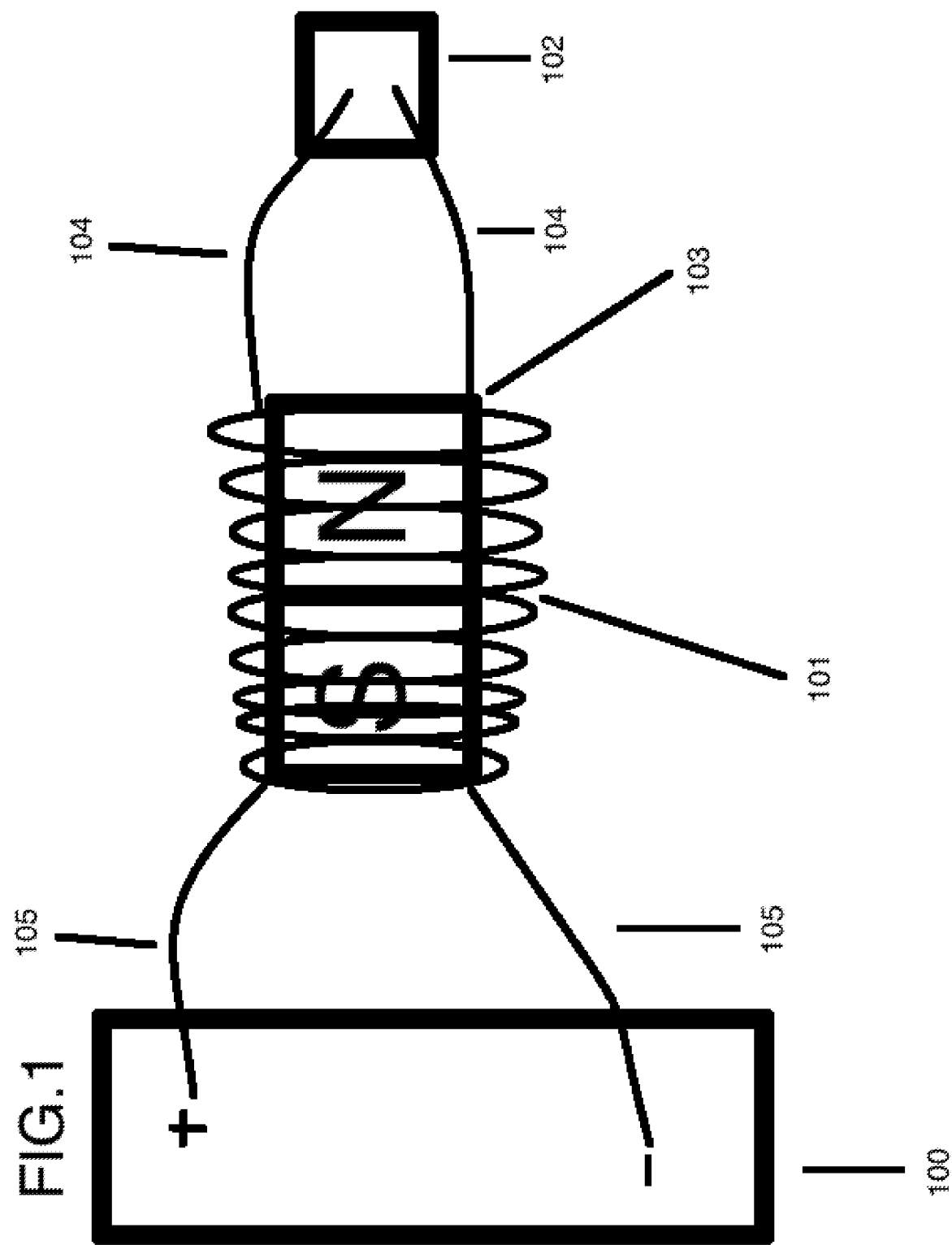

This application claims the benefit of Provisional Patent Application No. 62/524,294, filed Jun. 23, 2017, by the present inventor.

FIELD OF INVENTION

The present invention generally relates to air filters of vacuum devices.

BACKGROUND

Air filters are a common feature of vacuums used to filter the intake air of the vacuum. The air filter is used to remove dust and debris from the intake air before the air is released back into the environment. For example, U.S. Pat. No. 7,201,786 introduces an air filtration system for robotic vacuum cleaners wherein all intake air reaches an air filter and any dust and debris collected by the filter is designed to fall into a dust bin of the vacuum. However, in some instances, the air filter of the vacuum may become clogged by the collected dust and debris. This may drastically reduce the air intake of the vacuum and hence reduce its cleaning performance as it is more difficult for the motor to draw air in through the clogged filter and may lead to more frequent filter replacements. The present invention seeks to address this issue by providing a method to prevent or reduce dust and debris build-up on vacuum air filters, thereby minimizing the likelihood of air filter clogging.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

A method to prevent accumulation of particulates on an air filter of a robotic vacuum comprising, delivering electric current pulses in alternating directions through a metal wire connected to the air filter by a power source and vibrating the metal wire and connected air filter by placement of a permanent magnet in a location wherein a magnetic field of the permanent magnet and a magnetic field of the metal wire can interact.

A vibrating air filter for a robotic vacuum comprising, a metal wire connected on a first end to the air filter, a power source connected to a second end of the metal wire and delivering electric current pulses in alternating directions through the metal wire to create an electromagnet and, a permanent magnet placed in a location wherein a magnetic field of the permanent magnet and a magnetic field of the metal wire can interact and cause vibration of the metal wire and connected air filter.

An apparatus for preventing accumulation of particulates on an air filter of a robotic vacuum comprising, a metal wire connected to the air filter and a power source of the robotic vacuum and a permanent magnet, wherein the power source delivers electric current pulses in alternating directions through the metal wire, wherein a magnetic field of the permanent magnet interacts with a magnetic field of the metal wire and, wherein the metal wire and connected air filter vibrate.

BRIEF DESCRIPTION OF THE INVENTION

Non-limiting and non-exhaustive features of the present invention are described with reference to the following figures, wherein like reference numerals refer to like parts throughout the various figures.

Figure 2:
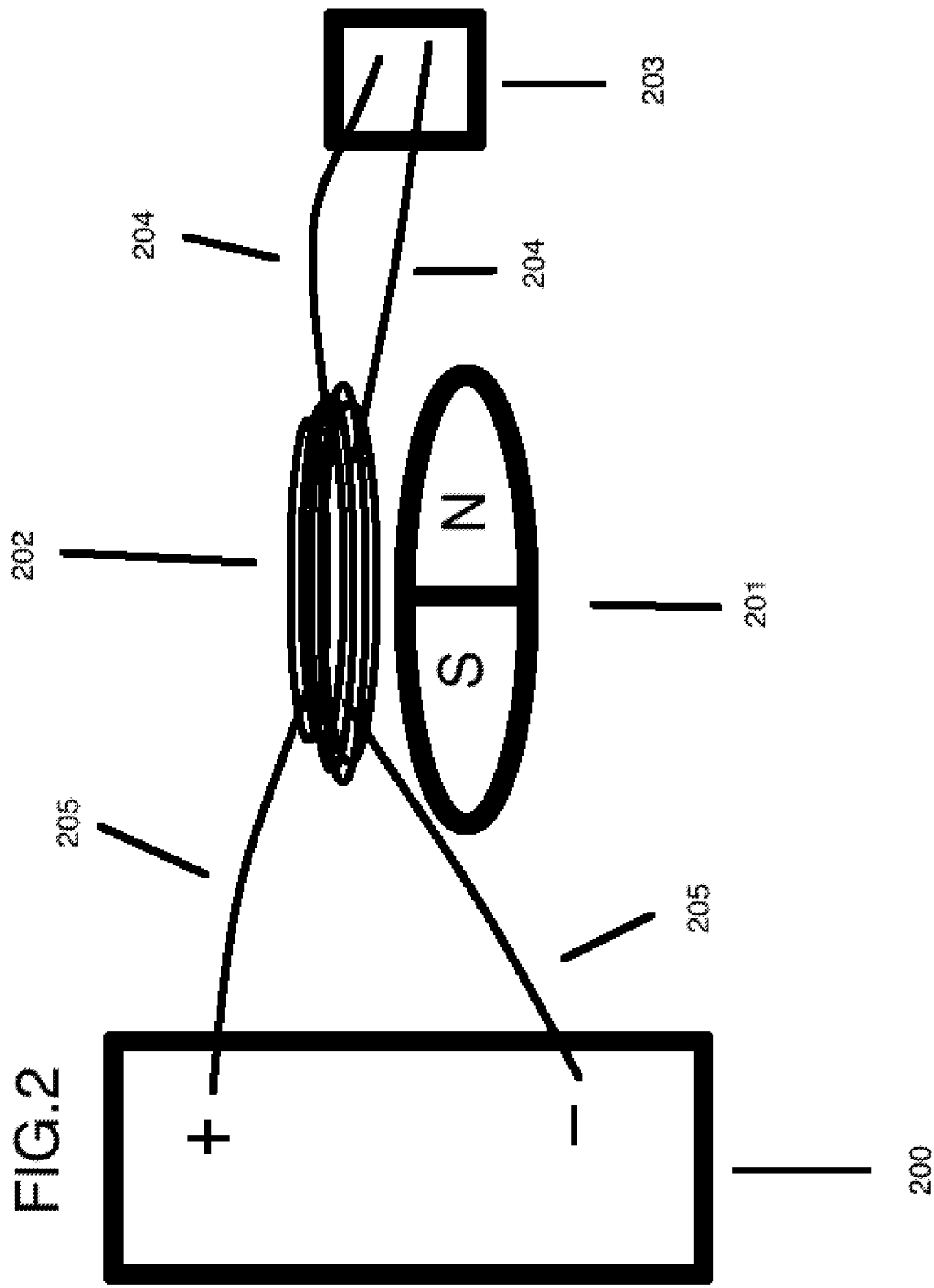
Figure 3:
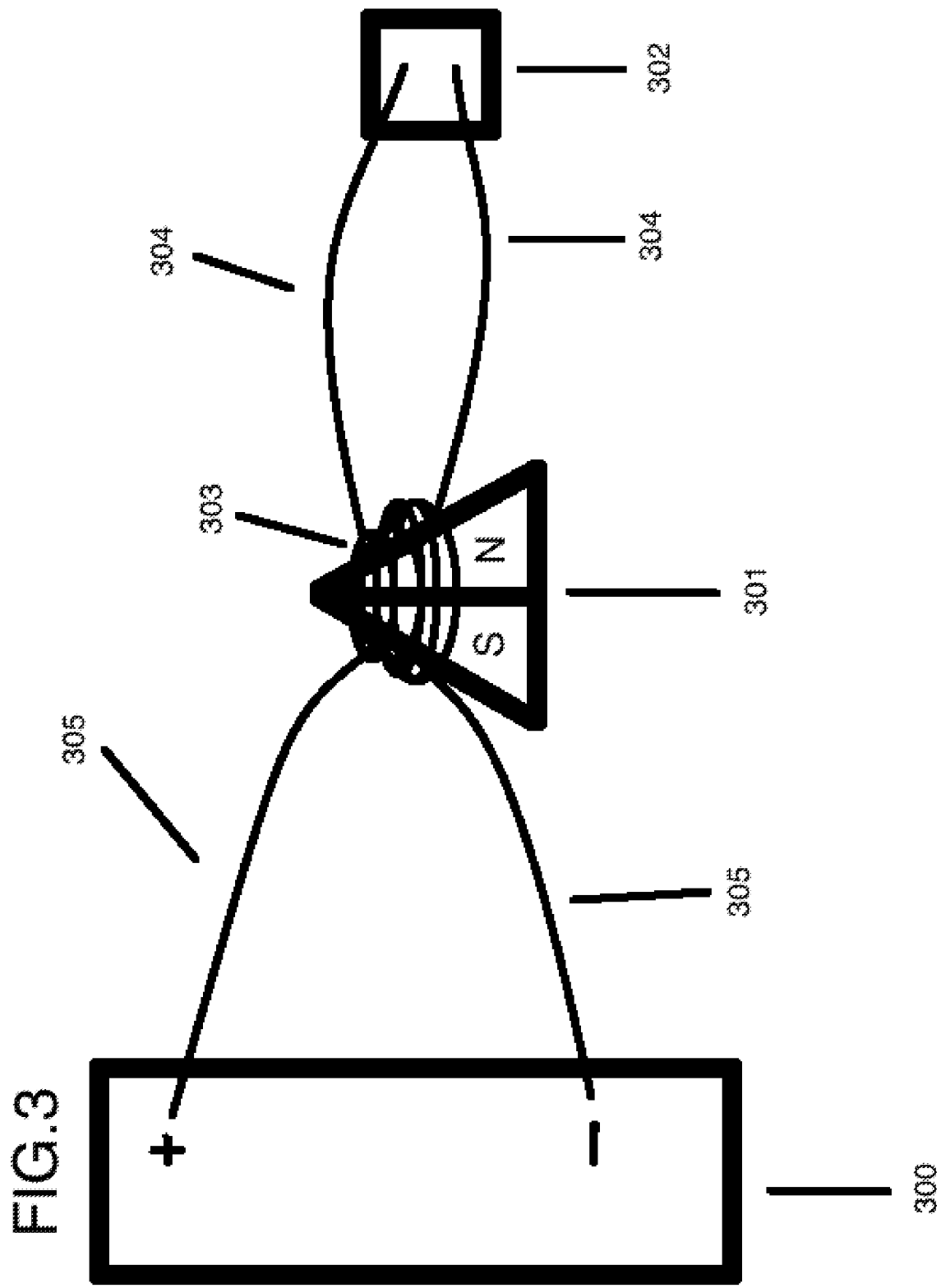

FIGS. 1-3 illustrate examples of possible configurations of a vibrating air filter of a vacuum embodying features of the present invention.

DESCRIPTION OF THE INVENTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Although various methods and techniques are described herein, it should be kept in mind that the invention might also cover articles of manufacture that include a computer readable medium on which computer-readable instructions for carrying out embodiments of the inventive methods or technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus may include a specialized computer and/or a dedicated computing device when appropriately programmed and may include a combination of a computer/computing device and dedicated/programmable circuits adapted for the various tasks pertaining to embodiments of the invention.

The present invention introduces embodiments of a method for preventing accumulation of particulates, such as dust and debris, on an air filter of a vacuum by use of a vibrating air filter that may loosen and shed into a dust bin of the robotic vacuum any dust and debris that may have latched onto the filter. Preventing build-up of dust and debris on the air filter is important as it may lead to the air filter clogging. Clogging of the air filter may result in drastic reduction in the air intake of the vacuum and hence reduce its cleaning performance as it is more difficult for the motor to draw air in through the clogged filter. Additionally, it may lead to more frequent filter replacements.

In embodiments, a vibrating filter may comprise an electromagnet, a permanent magnet and an air filter. In embodiments, the electromagnet may comprise a metal wire and a power source connected to a first end of the wire. The power source may deliver electric pulses in alternating directions through the wire creating an electromagnet. In embodiments, the metal wire may be coiled around the permanent magnet and a second end of the wire may be connected to an air filter. An electromagnet is similar to a permanent magnet, however reversing the direction of the electric current passing through the wire flips the poles of the electromagnet. Therefore, as pulses of electric current in alternating directions pass through the wire, the direction of the magnetic field may rapidly change causing it to be continuously attracted to and repelled from the permanent magnet. This may cause vibration of the wire and hence connected filter. Vibration of the filter may loosen any dust and debris latched onto the filter. In embodiments loosened dust and debris may be shed into a dust bin of the vacuum. In embodiments, the metal wire and permanent magnet may be adjacent to one another or may be configured in any other way that may allow their magnetic fields to interact and cause vibration of the metal wire and connected filter.

In embodiments, the permanent magnet may be any shape, such as circular, rectangular, triangular or any other shape that may allow the permanent magnet and electromagnet to interact and cause vibration of the metal wire and connected filter.

In embodiments, the power source and metal wire may be connected to each other using two electrical wires, one connected from the positive terminal of the power source to the metal wire and the other connect from the negative terminal of the power source to the metal wire. In embodiments, the air filter and metal wire may be connected to each other by at least one non-conductive connector such as a plastic connector.

In embodiments, the frequency of vibration (i.e. frequency of electric pulses sent through the wire) may be adjusted by a user and/or the control system of the robotic vacuum or may be predetermined. In embodiments, the frequency of vibration may be adjusted by the control system of the robotic vacuum based on the number of operating hours of the or the amount of dust and debris latched onto the air filter. The amount of dust and debris accumulation on the air filter may be determined by a sensor of the robotic vacuum.

In embodiments, a user and/or the control system of the robotic vacuum may activate and deactivate vibration of the filter. For example, the control system may activate vibration of the filter every tenth work session or after every ten hours of operation. In embodiments, the user may be notified by the control system of the robotic device when the air filter has some predetermined amount of collected dust and debris.

In embodiments, vibration of the filter may be activated during operation of the robotic vacuum or may be activated after cleaning an area. For example, a robotic vacuum may return to its docking station and activate vibration of the filter after cleaning an area. In embodiments, the vibrating filter may always be active.

In embodiments, a sensor may be placed so as to determine when dust and debris have accumulated on the filter. When the sensor detects that dust has accumulated on the filter, this information will be processed. Thereafter the filter will vibrate.

In embodiments, the duration of time that the filter is vibrated may be set by a user and/or control system of the robotic vacuum. For example, the control system may activate vibration of the filter for five minutes to loosen and shed the dust and debris.

In embodiments, the filter may be placed in any location within the chassis of the vacuum. For example, a vibrating filter may be placed before and/or after the motor.

In embodiments, the vibrating filter may be used with an autonomous or semi-autonomous robotic vacuum or may be used by a manually operated vacuum.

FIG. 1 illustrates an example of a possible configuration for a vibrating air filter. Power source 100 is connected to a first end of metal wire 101 by connecting wires 105. Air filter 102 is connected to a second end of metal wire 101 by connectors 104. Metal wire 101 is coiled around permanent magnet 103. Power source 100 may deliver electric current pulses in alternating directions to metal wire 101 through connecting wires 105, transforming metal wire 101 into an electromagnet. As pulses of electric current in alternating directions pass through metal wire 101, the poles and direction of the magnetic field rapidly change causing metal wire 101 to be continuously attracted to and repelled from permanent magnet 103. This causes vibration of metal wire 101 and connected air filter 102. Vibration of air filter 102 may loosen any dust and debris latched onto it. In embodiments loosened dust and debris may be shed into a dust bin of the vacuum.

FIG. 2 illustrates another example of a possible configuration for a vibrating air filter. Power source 200 is connected to a first end of metal wire 202 by connecting wires 205. Air filter 203 is connected to a second end of metal wire 202 by connectors 204. Metal wire 202 is coiled and located adjacent to permanent magnet 201. Power source 200 may deliver electric current pulses in alternating directions to metal wire 202 through connecting wires 205, transforming metal wire 202 into an electromagnet. As pulses of electric current in alternating directions pass through metal wire 202, the poles and direction of the magnetic field rapidly change causing metal wire 202 to be continuously attracted to and repelled from permanent magnet 201. This causes vibration of metal wire 202 and connected air filter 203. For example, when the poles of electromagnet 202 coincide with the poles of permanent magnet 201, electromagnet 202 is repelled from permanent magnet 201, moving in an upwards direction and when the poles are opposite permanent magnet 201, electromagnet 202 is attracted to permanent magnet 201, moving in downwards direction. If the poles of electromagnet 202 are rapidly changing, electromagnet 202 responds by rapidly moving in an upwards and downwards direction or otherwise vibrating. Vibration of air filter 203 may loosen any dust and debris latched onto it. In embodiments loosened dust and debris may be shed into a dust bin of the vacuum. Metal wire 202 and permanent magnet 201 may be placed in any configuration in relation to one another that may allow their magnetic fields to interact and cause vibration of metal wire 202 and connected air filter 203.

FIG. 3 illustrates a similar configuration for a vibrating air filter as described for FIG. 1, however with triangular permanent magnet 301 as opposed to rectangular permanent magnet 103 illustrated in FIG. 1. Power source 300 is connected to a first end of metal wire 301 by connecting wires 305. Air filter 302 is connected to a second end of metal wire 301 by connectors 304. Metal wire 303 is coiled around permanent magnet 301. Power source 300 may deliver electric current pulses in alternating directions to metal wire 301 through connecting wires 305, transforming metal wire 301 into an electromagnet. The interaction between magnetic fields of permanent magnet 301 and electromagnet 303 causes vibration of wire 303 and connected air filter 302. FIG. 3 is intended to demonstrate that permanent magnet 301 may be any shape, such as circular, rectangular, triangular or any other shape that may allow the magnetic fields of permanent magnet 301 and electromagnet 303 to interact and cause vibration of wire 303 and connected air filter 302.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

I claim:

1. A method to prevent accumulation of particulates on an air filter of a robotic vacuum comprising:
    delivering, by a power source, electric current pulses in alternating directions through a metal wire connected to the air filter; and,
    vibrating, by placement of a permanent magnet in a location wherein a magnetic field of the permanent magnet and an magnetic field of the metal wire can interact, the metal wire and connected air filter.

2. The method of claim 1, wherein a control system of the robotic vacuum can adjust the frequency of electric current pulses.

3. The method of claim 1, wherein the permanent magnet has two poles.

4. The method of claim 1, wherein the metal wire is coiled around the permanent magnet.

5. The method of claim 1, wherein the metal wire is located adjacent to the permanent magnet.

6. The method of claim 1, wherein the control system of the robotic vacuum can control the duration of vibration of the air filter.

7. The method of claim 1, wherein the control system of the robotic vacuum can activate and deactivate vibration of the air filter.

8. The method of claim 1, wherein the control system of the robotic vacuum can activate vibration of the air filter after each time a predetermined number of operational hours of the robotic vacuum have been completed.

9. The method of claim 1, wherein the control system of the robotic vacuum can activate vibration of the air filter after a predetermined amount of particulates accumulate on the air filter.

10. The method of claim 1, wherein particulates are shed from the air filter into a dust bin of the robotic vacuum when the air filter vibrates.

11. A vibrating air filter apparatus of a robotic vacuum comprising:
    a metal wire, wherein a first end of the metal wire is connected to the air filter and a second end of the metal wire is connected to a power source;
    a power source, wherein the power source is configured to deliver electric current pulses in alternating directions through the metal wire; and,
    a permanent magnet, wherein the permanent magnet is placed in a location wherein a magnetic field of the permanent magnet and a magnetic field of the metal wire can interact and cause vibration of the metal wire and connected air filter.

12. The apparatus of claim 11, wherein a control system of the robotic vacuum can adjust the frequency of electric current pulses.

13. The apparatus of claim 11, wherein the permanent magnet has two poles.

14. The apparatus of claim 11, wherein the metal wire is coiled around the permanent magnet.

15. The apparatus of claim 11, wherein the metal wire is located adjacent to the permanent magnet.

16. The apparatus of claim 11, wherein the control system of the robotic vacuum can control the duration of vibration of the air filter.

17. The apparatus of claim 11, wherein the control system of the robotic vacuum can activate and deactivate vibration of the air filter.

18. The apparatus of claim 11, wherein the control system of the robotic vacuum can activate vibration of the air filter after each time a predetermined number of operational hours of the robotic vacuum have been completed.

19. The apparatus of claim 11, wherein the control system of the robotic vacuum can activate vibration of the air filter after a predetermined amount of particulates accumulate on the air filter.

20. The apparatus of claim 1, wherein particulates are shed from the air filter into a dust bin of the robotic vacuum when the air filter vibrates.

* * * * *